Patented Jan. 3, 1950

2,493,549

UNITED STATES PATENT OFFICE 2,493,549

PREPARATION OF BASIC LEAD SALTS OF 2:4 DINITRO RESORCINOL

Leon Rubenstein, Saltcoats, Scotland, assignor to Imperial Chemical Industries Limited, a corporation of Great Britain No Drawing. Application July 8, 1947, Serial No. 759,703

In Great Britain September 4, 1946

6 Claims. (Cl. 260—435)

The present invention is concerned with an improved process for the manufacture of substantially monobasic lead salt of 2:4 dinitroresorcinol and has for its object to provide a substantially monobasic lead salt of 2:4 dinitroresorcinol in a condition of improved suitability for use in electric fuseheads and similar electric igniters.

The basic lead salts of polynitro phenolic compounds are made by a double decomposition reaction, usually carried out at substantially raised temperatures, between a solution of a soluble normal lead salt, e. g. lead nitrate, and a solution of the polynitro phenolic compound containing an excess of a soluble base, all in molecular quantities corresponding to the basicity of the basic lead salt required. The composition of the basic lead salts of polynitro phenolic compounds, however, is liable to vary considerably in accordance with the conditions under which they are prepared, and the product that is precipitated as a result of the interaction between the solutions used frequently comprises a mixture of chemical individuals of varying basicities, while marked variations in quality are often experienced even when the lead contents of the preparations of any particular basic lead salt of a polynitrophenolic compound prepared under the differing conditions are the same. The lead contents of the basic lead salts obtained when even slight variations are made in the method of preparation are liable to differ quite appreciably, but variations in the requisite properties may occur even if the lead contents are the same, while on the other hand products of appreciably differing lead contents may be equally serviceable.

The substantially monobasic lead salts of 2:4 dinitro-resorcinol as prepared by precipitation in the usual manner by the addition of a solution of 2 mols lead nitrate to a solution of 1 mol disodium salt of 2:4 dinitro-resorcinol and 2 mols sodium hydroxide at raised temperature when washed free from soluble salts and dried may contain from say 59 to 69% lead, and their easy ignitability when heated and excellent deflagrating characteristics would render them very suitable for use in electric fuseheads and similar electric igniters as the ingredient in the deflagrating bead or the like directly ignitable by the electrically heated conductor. They have, however, a marked tendency to gelate nitrocellulose solutions, and since the deflagrating bead or the like is ordinarily built up by alternately applying and drying off successive coats of a suspension of the ignitable ingredient in a viscous solution of nitrocellulose in a volatile solvent, this tendency to gelate nitrocellulose solutions is a serious disadvantage.

We have now found that this tendency to gelate nitrocellulose solutions is obviated if in a process for the production of a substantially monobasic lead salt of 2:4 dinitroresorcinol wherein a solution of a soluble normal lead salt is caused to react with an alkaline solution of 2:4 dinitroresorcinol at raised temperature, the precipitate of substantially monobasic lead salt of 2:4 dinitroresorcinol is treated with a small amount of an acid that has a soluble lead salt added gradually in a dilute state before the precipitate is washed free of soluble salts.

According to the present invention the process for the production of a substantially monobasic lead salt of 2:4 dinitroresorcinol in which are included the steps of forming a precipitate of this lead salt by reacting a solution of a soluble normal lead salt with an alkaline solution of 2:4 dinitroresorcinol at raised temperature and subsequently washing the precipitate thus formed free from soluble salts comprises gradually adding a small amount of a dilute solution of an acid that has a soluble lead salt to the said precipitate prior to the said washing.

Preferably the acid having a soluble lead salt is introduced dropwise into the liquor containing the precipitate or suspension of the monobasic lead salt of 2:4 dinitroresorcinol and the by-products of the precipitation. The acid used may advantageously be nitric or acetic and the quantity may be equivalent to say $\frac{1}{6}$ to $\frac{2}{3}$ mols per mol monobasic lead salt of dinitroresorcinol.

As a result of the addition of the acid the colour of the precipitate may become redder if the precipitate was originally yellow, and the precipitate may become denser. Using $\frac{1}{6}$ mol nitric acid the pH of the suspension containing the by-products measured at room temperature may fall from about 6.5 to 6.2.

When the precipitation is carried out by adding the calculated amount of a lead nitrate solution to a solution containing the dinitroresorcinol and up to the calculated amount of a soluble base, especially at temperatures below 70° C., there is frequently deposited an appreciable amount of an inactive nitrogen free lead compound that is a possibly somewhat hydrated form of lead oxide. This material adheres to the base of the vessel when this is made of glass, and the monobasic lead salt of 2:4 dinitroresorcinate suspension may be decanted and washed away from it either before or after the addition of the acid, which in the quantity employed does not dissolve the deposit. The lead content of the substantially monobasic lead salt of 2:4 dinitroresorcinol is, however, slightly reduced by the treatment.

The invention is illustrated by the following examples.

*Example I*

10 gm. 2:4 dinitroresorcinol (1 mol) are dissolved in 200 c. c. N/1 sodium hydroxide solution (4 mol) and 200 c. c. water. The solution is filtered and heated to 52° C. in a glass vessel, and into it is added at a constant rate over a period of 12 minutes 330 c. c. of a filtered solution containing 100 gm. load nitrate per litre, the mixture being stirred and the temperature being kept from falling below 50° C. An orange coloured precipitate is formed. The mixture is cooled and allowed to stand. It is noted that a small amount of a yellow precipitate of different appearance to the main portion of the precipitate adheres to the bottom of the glass vessel. The mixture is stirred without disturbing this, and to it is added dropwise 10 c. c. of a 20% solution of nitric acid. This causes the main portion of the precipitate to assume a reddish colour and to densify, but does not appear to affect the yellowish material adhering to the bottom of the glass vessel, which proves to be free from nitrogen and amounts to 0.6 gm. The liquor is decanted and the reddish precipitate is flushed into a filter, care being taken not to include any of the yellow adherent material, and is washed free from salts. It is next washed with acetone to remove the water and finally with amyl acetate. On admixture with a solution of nitrocellulose in amyl acetate it produces no gelation within a week, and yields fuseheads of satisfactory quality. The lead content of the dried substantially monobasic lead salt of 2:4 dinitroresorcinol is 63.2%.

In an experiment not in accordance with the invention wherein the same quantities of reagents are used and same procedure adopted except that the nitric acid treatment is omitted, the orange substantially monobasic lead salt of 2:4 dinitroresorcinol obtained has a lead content of 66.9% and does not flow easily. It gelates a solution of nitrocellulose in amyl acetate shortly after being mixed into it.

*Example II*

The quantities of the reagents employed for the precipitation are the same as in Example I and the lead nitrate solution is added at about 51° C. to the solution containing the dinitroresorcinol and the sodium hydroxide. 10 c. c. of 18% acetic acid are added to the cooled reaction mixture, instead of 10 c. c. 20% nitric acid. This causes the orange precipitate to become reddish in colour and denser, and when washed and dried the reddish basic lead salt of 2:4 dinitroresorcinol has a lead content of 67%.

When it is mixed with a solution of nitrocellulose in amyl acetate no gelation occurs within a week. The firing properties are satisfactory. In this case the amount of inactive yellow precipitate adhering to the bottom of the precipitating vessel is about .16 gm.

*Example III*

The quantities of the reagents employed and the procedure are the same as in Example I except that the temperature at which the precipitation is carried out is 71° C. In this case the precipitate becomes reddish even before the addition of the nitric acid, but a washed and dehydrated sample of the product at this stage gelates a nitrocellulose solution in amyl acetate while being mixed with it. The lead content of the dried salt is 64%. After the treatment with nitric acid, however, the washed and dehydrated substantially monobasic salt does not gelate the nitrocellulose solution within a week. Its ignition properties are satisfactory. The lead content of the dried salt is 60.5%. The amount of inactive nitrogen free lead compound adhering to the bottom of the glass precipitating vessel is about 0.1 gm.

*Example IV*

The quantities of the reagents for the precipitation are 10 gm. 2:4 dinitroresorcinol, 190 c. c. N/1 sodium hydroxide, 210 c. c. water and 330 c. c. of a solution of lead nitrate containing 100 gm. lead nitrate per litre. The precipitation is carried out as in Example I except that the precipitation temperature is 71° C. The reaction mixture containing the precipitate which becomes reddish, is cooled to 60° C. and 5 c. c. 10% nitric acid are added dropwise over 3 minutes. The resulting washed and dehydrated substantially monobasic lead salt of 2:4 dinitroresorcinol does not gelate a nitrocellulose solution in amyl acetate within a week, and yields satisfactory fuseheads. The dried salt has a lead content of 61.3%. There is no evidence of any yellow inactive lead compound adhering to the bottom of the precipitating vessel.

I claim:

1. A process for the production of a substantially monobasic lead salt of 2:4 dinitroresorcinol in which are included the steps of forming a precipitate of the lead salt by reacting a solution of a soluble normal lead salt with an alkaline solution of 2:4 dinitroresorcinol at a raised temperature, gradually adding to the liquor containing the precipitate formed a small amount of a dilute solution of an acid, the lead salt of which is soluble, removing the desired precipitate, and washing this desired precipitate free from the salts formed as by-products of the precipitation.

2. A process as claimed in claim 1 wherein the acid, the lead salt of which is soluble, is introduced dropwise into the liquor containing the precipitate of the monobasic lead salt of 2:4 dinitroresorcinol and the by-products of the first precipitation.

3. A process as claimed in claim 1 wherein the acid, the lead salt of which is soluble, is nitric acid.

4. A process as claimed in claim 1 wherein the acid, the lead salt of which is soluble, is acetic acid.

5. A process as claimed in claim 1 wherein the acid, the lead salt of which is soluble, is added in a quantity of from about 1/6 to 2/3 of a mole per mole of the mono lead salt of dinitroresorcinol.

6. A process for the production of a substantially monobasic lead salt of 2:4 dinitroresorcinol in which are included the steps of forming a precipitate of this lead salt in a glass vessel by reacting a solution of a soluble normal lead salt with an alkaline solution of 2:4 dinitroresorcinol at a raised temperature, gradually adding a small amount of a dilute solution of an acid, the lead salt of which is soluble, decanting the liquor, removing the monobasic lead salt of 2:4 dinitroresorcinate, excluding any of the precipitate of the inactive nitrogen free lead compound which is distinguishable by its color and adherence to the base of the vessel, and washing the precipitate thus removed free from the soluble salts formed as by-products of the precipitation.

LEON RUBENSTEIN.

REFERENCES CITED

The following references are of record in the file of this patent:

UNITED STATES PATENTS

| Number | Name | Date |
|---|---|---|
| 2,116,514 | Hale et al. | May 10, 1938 |
| 2,177,657 | Kerone et al. | Oct. 31, 1939 |
| 2,226,391 | Rubenstein | Dec. 24, 1940 |

FOREIGN PATENTS

| Number | Country | Date |
|---|---|---|
| 192,830 | Great Britan | Feb. 15, 1923 |